United States Patent [19]

Storm et al.

[11] Patent Number: 6,144,649
[45] Date of Patent: *Nov. 7, 2000

[54] METHOD AND APPARATUS FOR ACQUIRING A PILOT SIGNAL IN A CDMA RECEIVER

[75] Inventors: Brian D. Storm, Round Lake Beach; Christopher P. La Rosa, Lake Zurich, both of Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/807,075

[22] Filed: Feb. 27, 1997

[51] Int. Cl.[7] .............................. H04B 7/216; H04J 13/04
[52] U.S. Cl. ..................... 370/335; 370/342; 375/206; 375/208
[58] Field of Search ................................ 370/342, 320, 370/500, 520, 335; 375/200, 208, 205, 206, 210

[56] References Cited

U.S. PATENT DOCUMENTS

| | | | |
|---|---|---|---|
| 5,109,390 | 4/1992 | Gilhousen et al. | 375/1 |
| 5,440,597 | 8/1995 | Chung et al. | 370/200 |
| 5,550,811 | 8/1996 | Kaku et al. | 375/206 |
| 5,577,022 | 11/1996 | Padovani et al. | 375/208 |
| 5,577,025 | 11/1996 | Skinner et al. | 370/22 |
| 5,596,571 | 1/1997 | Gould et al. | 370/335 |
| 5,608,722 | 3/1997 | Miller | 370/320 |
| 5,627,835 | 5/1997 | Witter | 370/320 |
| 5,654,979 | 8/1997 | Levin et al. | 375/142 |
| 5,659,573 | 8/1997 | Bruckert et al. | 375/142 |
| 5,710,768 | 1/1998 | Ziv et al. | 370/342 |
| 5,737,327 | 4/1998 | Ling et al. | 370/335 |
| 5,764,687 | 6/1998 | Easton | 375/147 |
| 5,768,306 | 6/1998 | Sawahashi et al. | 375/206 |
| 5,867,527 | 2/1999 | Ziv et al. | 375/147 |
| 5,870,378 | 2/1999 | Huang et al. | 370/342 |
| 5,881,056 | 3/1999 | Huang et al. | 370/335 |

FOREIGN PATENT DOCUMENTS

| | | |
|---|---|---|
| 0 528 775 A1 | 2/1993 | European Pat. Off. . |
| 0 593 185 A1 | 4/1994 | European Pat. Off. . |
| 0 690 588 A2 | 1/1996 | European Pat. Off. . |
| 0 756 387 A2 | 1/1997 | European Pat. Off. . |
| 0 794 623 A2 | 9/1997 | European Pat. Off. . |
| 2 206 243 | 12/1988 | United Kingdom . |
| WO 96/10873 | 4/1996 | WIPO . |
| WO 96/35268 | 11/1996 | WIPO . |
| WO 97/01227 | 1/1997 | WIPO . |
| WO 97/18601 | 5/1997 | WIPO . |

*Primary Examiner*—Alpus H. Hsu
*Attorney, Agent, or Firm*—John G. Rauch; Paul J. Bartusiak

[57] ABSTRACT

A searcher receiver (114) includes a sample buffer (202) which stores signal samples loaded using a real time clock. A real time linear sequence generator (RT LSG) (206) stores an initial state and is clocked using the real time clock. The contents of the RT LSG are loaded into a non-real time linear sequence generator (NRT LSG) (208) when sample processing begins. Samples are correlated using a non-real time clock to allow signal processing to be uncoupled from the chip rate. The analog front end (108) may be powered down or tuned to another frequency during non-real time processing.

27 Claims, 5 Drawing Sheets

METHOD AND APPARATUS FOR ACQUIRING A PILOT SIGNAL IN A CDMA RECEIVER

FIELD OF THE INVENTION

The present invention relates generally to digital communication. More particularly, the present invention relates to a method and apparatus for pilot channel acquisition in a spread spectrum communication system such as a code division multiple access (CDMA) cellular telephone system.

BACKGROUND OF THE INVENTION

Direct sequence code division multiple access (DS-CDMA) communication systems have been proposed for use in cellular telephone systems with traffic channels located at 800 MHz and in the personal communication system (PCS) frequency band at 1800 MHz. In a DS-CDMA system, all base stations in all cells may use the same radio frequency for communication. One known DS-CDMA system is defined in Telecommunications Industry Association/Electronic Industry Association (TIA/EIA) Interim Standard IS-95, "Mobile Station-Base Station Compatibility Standard for Dual-Mode Wideband Spread Spectrum Cellular System" (IS-95).

In addition to traffic channels, each base station broadcasts a pilot channel, a synchronization channel, and a paging channel. The pilot channel or pilot signal is a pseudorandom noise or PN code. The pilot channel is commonly received by all mobile stations within range and is used by the mobile station for identifying the presence of a CDMA system, initial system acquisition, idle mode hand-off, identification of initial and delayed rays of communicating and interfering base stations, and for coherent demodulation of the synchronization, paging, and traffic channels.

The pilot signal transmitted by each base station in the system uses the same PN code but with a different phase offset. The base stations are uniquely identified by using a unique starting phase or starting time for the PN sequences. For example, in IS-95, the sequences are of length $2^{15}$ chips and are produced at a chip rate of 1.2288 Mega-chips per second and thus repeat every 26⅔ milliseconds. The minimum time separations are 64 chips in length allowing a total of 512 different PN code phase assignments for the base stations.

At the mobile station, the received RF signals include pilot, synchronization, paging, and traffic channels from all nearby base stations. The mobile station must identify all the pilot signals that are receivable including the pilot signal from the base station with the strongest pilot channel. In prior art mobile stations, a correlator has been used as a receiver pilot searching element to serially search for the PN phases of the receivable pilots. The received PN phase is correlated with system PN codes generated in the mobile station. Knowledge of the correct PN phases of the base site(s) with which the mobile station communicates allows the coherent detection of all the other channels transmitted by the base station. Incorrect PN phases will produce a minimal output from the correlator.

Because the PN sequence phase space is large, the prior art serial, real time, correlation technique has taken a prohibitively long time to correctly locate pilot signal energy. At a minimum, with strong signals, system acquisition upon powering up the mobile station can take up to 2.5 seconds or more. With no receivable pilots present, the mobile station will continue to search the entire phase space of the PN sequences until a system time out occurs, which may be 15 seconds. Then the mobile station moves to another RF frequency and again attempts to acquire the CDMA system. The searching process is repeated on subsequent frequencies until a pilot signal is found.

The long time delay in system acquisition is inconvenient and undesirable for most users. A user turning on a radiotelephone expects to be able to use the radiotelephone immediately, with minimal delay. A delay of even 2.5 seconds is too long for many users and longer delays could have serious consequences, for example, for emergency "911" calls.

The prior art pilot channel searching method creates further limitations for all of the other uses of the pilot channel after initial system acquisition. Typical DS-CDMA mobile station receivers utilize a rake receiver having three or more independently controlled fingers which are time aligned to the correct PN sequence phases as determined by the receiver pilot phase searching element. The rake fingers are normally assigned to the strongest rays received from all communicating base stations as determined by the receiver pilot phase searching element. Ray assignments are updated in a maintenance process using the pilot phase searching element information.

If the pilot phase searching element is slow, resulting in slow maintenance of the assignment of the strongest rays to the rake fingers, the receiving performance of the mobile station is degraded under fading conditions. Under certain conditions called "rapid PN," there is a high percentage of dropped calls. The rapid PN problem occurs because the available PN pilot signals are changing so fast that prior art searching elements cannot keep up.

Idle hand-off is the process of attaching to and listening to the paging channel of the base station with the strongest pilot as identified by the pilot searching element. When the mobile station receives a page or accesses the system to place a call, it is important that the mobile station is listening to the page from or tries to access the base station associated with the strongest received pilot. This requires a fast pilot phase searching element, particularly when the mobile station is in motion.

The poor performance of the prior art searching mechanism also affects the soft handoff performance of the mobile station. When in a call on a traffic channel, the pilot searching element is used to maintain the proper rake finger assignments for optimum demodulation of the traffic channel and to identify interfering base sites. If an interfering base site is found, it is reported by the mobile station to the base site as a candidate for soft hand-off. Soft hand-off is a DS-CDMA system condition where a mobile station is communicating with more than one base site simultaneously. Pilot signals from adjacent base stations need not be closely located in the pilot phase space. Thus, in addition to speed, the searching element needs to be nimble, that is, able to look across the entire phase space as well as looking only at specific PN offsets.

New requirements for mobile stations will require Mobile Assisted Hard Handoff, or MAHHO, capabilities. In MAHHO, the mobile station changes the frequency of the radio link as it is handed off from one base station to another. Due to the full duplex nature of the CDMA air interface, this requires breaking the radio link, going to another frequency, looking for pilot signals, returning to the original frequency and reacquiring the pilot to reestablish the link. The prior art searching element which requires 2.5 seconds to acquire a pilot is unsuitable for MAHHO purposes.

Another limitation of the prior art involves slotted mode operation. For battery powered portable mobile stations it is also very important to conserve battery charge when waiting for pages. IS-95 provides a slotted mode that allows portable stations to power down except for the periods when their assigned paging slot information is transmitted by the base stations. The paging slot interval can be as short as 1.28 seconds, and periods of 1.28 seconds multiplied by powers of two can be used for more battery savings. During these intervals, the mobile station only needs to monitor the paging channel for up to 160 ms and "sleeps" in a low power mode the remainder of the time.

When operating in slotted mode, a portable station may have to search the phase space of as many as twenty base stations every time it wakes up. To reliably receive the paging slot after waking up, the portable station must be listening to the base station which is providing adequate signal strength. When the mobile station is in motion, the correct base station to decode can easily change from one paging interval to the next paging interval. Therefore it is very important to have a fast pilot searching mechanism to identify the correct base station pilot before the start of the assigned paging slot. Using the prior art pilot searching mechanism requires the portable station to wake up well before the paging slot to allow sufficient time to sequentially search the PN sequence phase space. This negates a substantial part of the potential battery savings afforded by slotted mode.

Accordingly there is a need for a fast and accurate pilot searching mechanism that will improve mobile station performance in the areas of DS-CDMA system identification (service detection), initial system acquisition, idle mode hand-off, soft hand-off, slotted mode operation, and identification of initial and delayed rays of communicating and interfering base stations for the purposes of coherent demodulation of the synchronization, paging, and traffic channels.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF A PREFERRED EMBODIMENT

Figure 1:
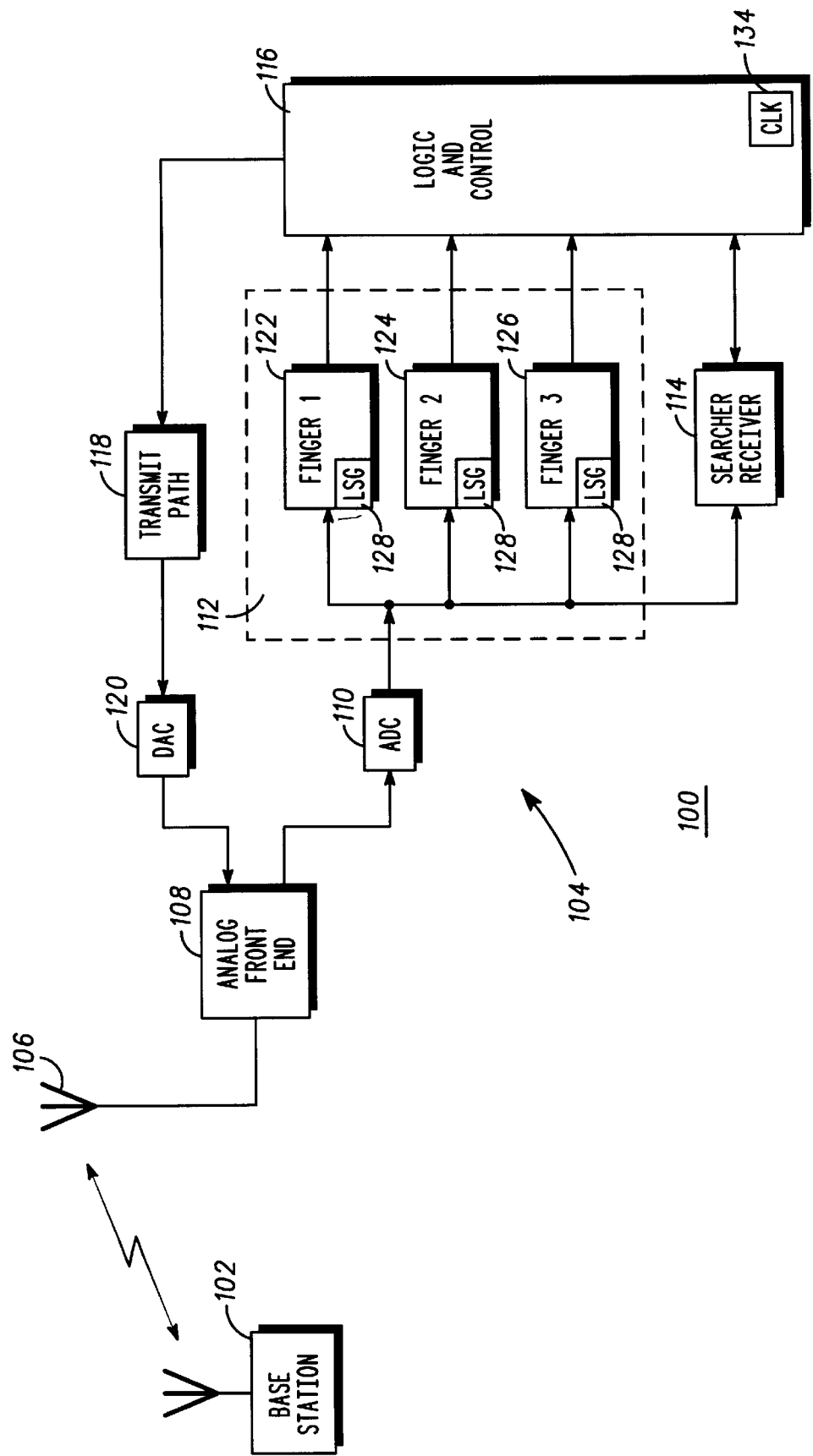
FIG. 1 is a block diagram of a communication system.

Referring now to FIG. 1, a communication system 100 includes a plurality of base stations such as base station 102 configured for radio communication with one or more mobile stations such as radiotelephone 104. The radiotelephone 104 is configured to receive and transmit direct sequence code division multiple access (DS-CDMA) signals to communicate with the plurality of base stations, including base station 102. In the illustrated embodiment, the communication system 100 operates according to TIA/EIA Interim Standard IS-95, "Mobile Station-Base Station Compatibility Standard for Dual-Mode Wideband Spread Spectrum Cellular System," operating at 800 MHz. Alternatively, the communication system 100 could operate in accordance with other DS-CDMA systems including PCS systems at 1800 MHz or with any other suitable DS-CDMA system.

The base station 102 transmits spread spectrum signals to the radiotelephone 104. The symbols on the traffic channel are spread using a Walsh code in a process known as Walsh covering. Each mobile station such as the radiotelephone 104 is assigned a unique Walsh code by the base station 102 so that the traffic channel transmission to each mobile station is orthogonal to traffic channel transmissions to every other mobile station.

In addition to traffic channels, the base station 102 broadcasts a pilot channel, a synchronization channel and a paging channel. The pilot channel is formed using an all-zero data sequence that is covered by Walsh code 0, which consists of all zeros. The pilot channel is commonly received by all mobile stations within range and is used by the radiotelephone 104 for identifying the presence of a CDMA system, initial system acquisition, idle mode hand-off, identification of initial and delayed rays of communicating and interfering base stations, and for coherent demodulation of the synchronization, paging, and traffic channels. The synchronization channel is used for synchronizing mobile station timing to base station timing. The paging channel is used for sending paging information from the base station 102 to mobile stations including the radiotelephone 104.

In addition to the Walsh covering, all channels transmitted by the base station are spread using a pseudorandom noise (PN) sequence, also referred to as the pilot sequence. The base station 102 and all base stations in the communication system 100 are uniquely identified by using a unique starting phase, also referred to as a starting time or phase shift, for the pilot channel sequence. The sequences are of length $2^{15}$ chips and are produced at a chip rate of 1.2288 Mega-chips per second and thus repeat every 26⅔ milliseconds. The minimum permitted time separation is 64 chips, allowing a total of 512 different PN code phase assignments. The spread pilot channel modulates a radio frequency (RF) carrier and is transmitted to all mobile stations including the radiotelephone 104 in a geographic area served by the base station 102. The PN sequence is complex in nature, comprising both in-phase (I) and quadrature (Q) components. It will be recognized by those ordinarily skilled in the art that all processing of the pilot signal described herein involves both I and Q components.

The radiotelephone 104 comprises an antenna 106, an analog front end 108, a receive path including an analog to digital converter (ADC) 110, a rake receiver 112 and a searcher receiver 114, a controller 116, and a transmit path including a transmission path circuit 118 and a digital to analog converter 120. The antenna 106 receives RF signals from the base station 102 and from other base stations in the vicinity. Some of the received RF signals are directly transmitted, line of sight rays transmitted by the base station. Other received RF signals are reflected or multipath rays and are delayed in time.

Received RF signals are converted to electrical signals by the antenna 106 and provided to the analog front end 108. The analog front end 108 filters the signals and provides conversion to baseband signals. The analog baseband signals are provided to the ADC 110, which converts them to streams of digital data for further processing.

The rake receiver 112 includes a plurality of receiver fingers, including receiver finger 122, receiver finger 124 and receiver finger 126. In the illustrated embodiment, the rake receiver 112 includes three receiver fingers. However, any suitable number of receiver fingers could be used. The receiver fingers are of conventional design. Each receiver finger has a finger linear sequence generator (LSG) 128 used in detection of pilot signals in the receiver finger.

The controller 116 includes a clock 134. The clock 134 controls timing of the radiotelephone 104. The controller 116 is coupled to other elements of the radiotelephone 104. Such interconnections are not shown in FIG. 1 so as to not unduly complicate the drawing figure.

The searcher receiver 114 detects pilot signals received by the radiotelephone 104 from the plurality of base stations including the base station 102. The searcher receiver 114 despreads pilot signals using a correlator with PN codes generated in the radiotelephone 104 using local reference timing. After this despreading, the signal values for each chip period are accumulated over a preselected interval of time. This provides a coherent sum of chip values. This sum is compared against a threshold level. Sums exceeding the threshold level generally indicate that appropriate pilot signal timing has been determined. Structure and operation of the searcher receiver 114 will be discussed in detail below in conjunction with FIG. 2.

Figure 2:
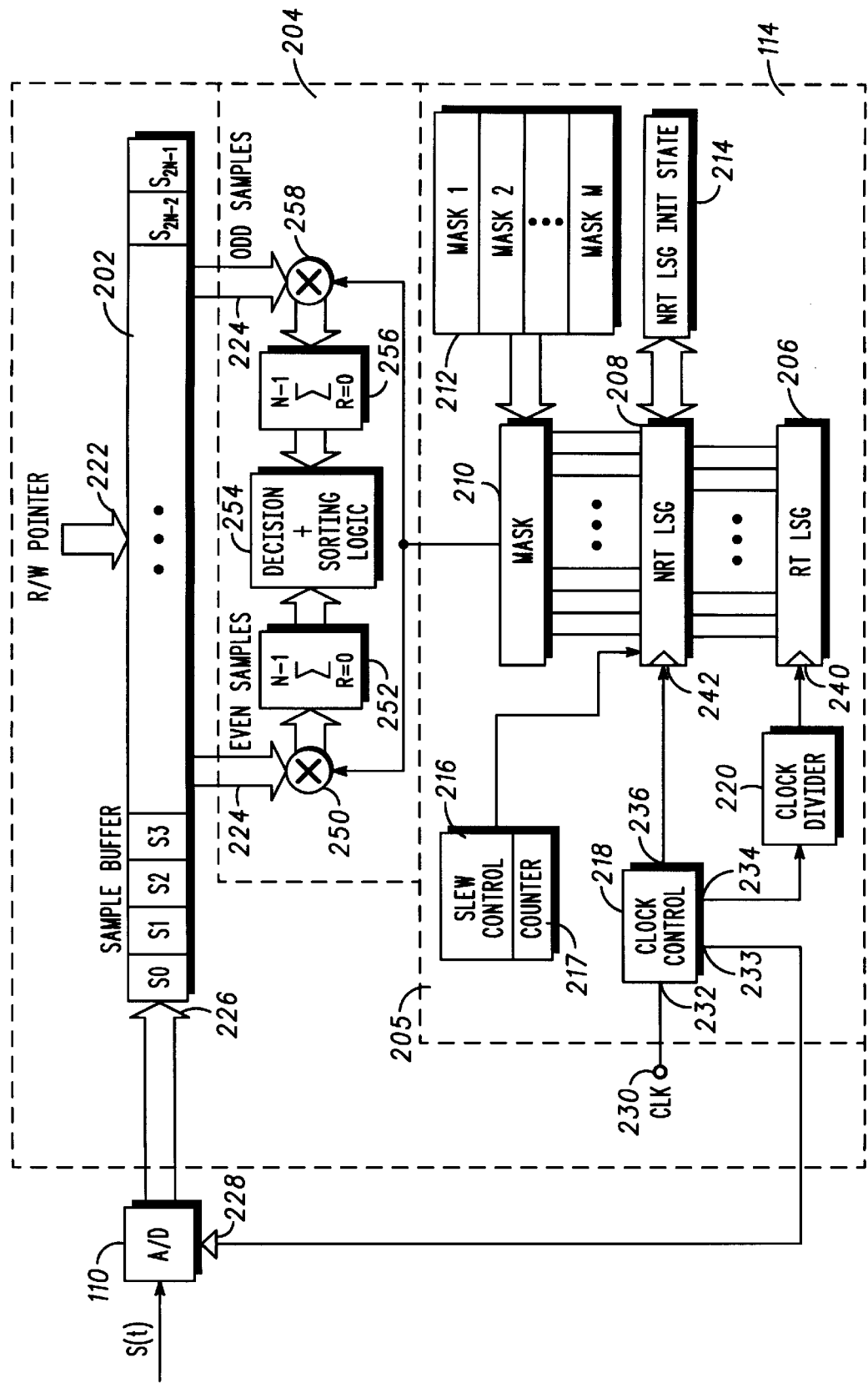
FIG. 2 is a block diagram of a searcher receiver for use in the radiotelephone of FIG. 1.

Referring now to FIG. 2, the searcher receiver 114 includes a sample buffer 202, a correlator 204, and a PN generator 205. The PN generator 205 includes a real-time linear sequence generator (RT LSG) 206, a non-real time linear sequence generator (NRT LSG) 208, a mask circuit 210, a mask register 212, a register 214, a slew controller 216, a slew counter 217, a clock controller 218 and a clock divider 220.

The searcher receiver 114 detects pilot signals to acquire system timing for the radiotelephone 104. In accordance with the present invention, the searcher receiver 114 samples the received signal at a first rate, storing a plurality of signal samples. The searcher receiver 114 then processes the plurality of signal samples at a second rate, the second rate being greater than the first rate, and identifies one or more signals based on the plurality of pilot signal samples.

The sample buffer 202 collects a predetermined number of signal samples. The sample buffer 202 has an input 226 coupled to the ADC 110 and an output 224 coupled to the correlator 204. The ADC receives an analog signal s(t) from the analog front end 108 and converts the analog signal to digital samples. The ADC has a clock input 228 coupled to the clock controller 218 and produces one digital sample in response to each received clock signal.

The clock controller 218 has an input 232 coupled to a clock input, a first output 233 coupled to the ADC 110, a second output 234 coupled to the clock divider 220, and a third output 236 coupled to the NRT LSG 208. The clock controller 218 produces clock signals at the first output 233 to provide a real time sample clock to the ADC 110. The clock controller 218 produces clock signals at the second output 234 to provide a real time chip clock to the RT LSG 206. The real time chip clock increments the RT LSG 206 as samples are stored in the sample buffer 202. The clock controller 218 produces clock signals at the third output 236 to provide a non-real time chip clock. The clock input 230 receives clocking signals from any suitable source, such as the clock 134 of the controller 116. In the illustrated embodiment, the clock controller 218 provides the real time sample clock to the ADC 110 at a rate twice the chip rate of 1.2288 Mega-chips per second. Other suitable sampling rates may be selected.

As a result, during each chip time, two samples are stored in the sample buffer 202. The samples are stored sequentially, in first in, first out fashion. A read/write pointer 222 indicates the location in the sample buffer for reading and writing data. A total of 2N samples are stored, where N is the span of the sample buffer in chip intervals. Stated alternately, N is the correlation length and 2N is the buffer size. One example for the dimension of the sample buffer is 512.

The samples stored in the sample buffer 202 represent the signal received at the radiotelephone 104 from any nearby base station, such as base station 102 (FIG. 1). The signal may contain a directly-received pilot signal or a multipath ray. The sample buffer 202 thus provides a buffer for storing a plurality of samples of a received signal.

The RT LSG 206 is a conventional linear sequence generator which produces a pseudo-random sequence from a given starting point in response to a clock signal received at an input 240. The RT LSG 206 receives clock signals from the clock controller 218. These clock signals are thus real-time clock signals and the RT LSG generates a sequence of values in response to the real time clock signal.

The NRT LSG 208 is a conventional LSG which produces a sequence identical to the sequence produced by the RT LSG 206 when loaded with the same state and clocked via input 242. In accordance with the present invention, the searcher receiver 114 loads the state of the RT LSG 206 into the NRT LSG 208 at a particular point in time relative to storing the predetermined number of samples in the sample buffer 202. At substantially the same time, the contents of the RT LSG 206 are transferred into the register 214 for subsequent use. The operation of loading the NRT LSG state from the RT LSG state at a specific point in time relative to filling the buffer provides a timing reference. From this timing reference, outputs from non-real time circuits can be mapped to real-time timing adjustments using the slew counter 217. The register 214 thus stores the initial state of the NRT LSG 208 to allow the NRT LSG to be reset to its initial reference value.

The clock input 242 of the NRT LSG 208 is coupled to the second clock output 236 of the clock controller 218. In accordance with the present invention, the NRT LSG 208 is clocked at a rate different from and substantially faster than the RT LSG 206. Thus, the NRT LSG 208 increments in response to a non-real time clock signal.

The mask circuit 210 employs a predetermined mask that, when Exclusive-ORed with the contents of the NRT LSG 208, yields the correct state of the PN generator 205 at a predetermined time in the future. The mask circuit 210 is loaded with any mask stored in the mask register 212, such as mask 1, mask 2, . . . mask M. The masks correspond to individual phases of the phase space of the pilot signals in the communication system 100 (FIG. 1).

The correlator 204 correlates the plurality of samples in the sample buffer 202 and the sequence of values from the NRT LSG and produces a correlation result. In the illustrated embodiment, the correlator 204 includes a first correlator, including multiplier 250 and summer 252, and a second correlator, including a summer 256 and multiplier 258. The correlator 204 also includes logic 254. The multiplier 250 and summer 252 produce a first correlation result based on even-numbered samples from the sample buffer 202 and provide the first correlation result to the logic 254. The multiplier 258 and summer 256 produce a second correlation result based on odd-numbered samples from the sample buffer 202 and provide the second correlation result to the logic 254. In the illustrated embodiment, the second correlator, including multiplier 258, receives samples from the sample buffer 202 which are one sample (one-half chip time) later than samples received by the first correlator including multiplier 250

It will be recognized that any number of sample phases could be processed in correlator 204 by varying the number of correlators and associated logic. Reducing from two phases to one phase by sampling once every chip time would reduce the hardware required by eliminating one correlator. On the other hand, increasing the number of phases would provide better time resolution for the correlation.

The logic 254 compares the correlation result to a predetermined threshold and discards correlation results that do not exceed the threshold. Correlation results which at least exceed the threshold are stored as corresponding to possible correct pilot phases. Thus, the logic 254 includes some memory for storing data. The stored correlation results are sorted to provide an indication of relative pilot phase correlation.

The slew controller 216 controls slewing of the NRT LSG 208 to permit proper alignment of the NRT LSG with the RT LSG. Each time the NRT LSG 208 is incremented relative to the RT LSG, the slew counter 217 is incremented. At the moment the RT LSG 206 state is loaded into the NRT LSG 208, the two sequence generators are synchronized and the slew counter 217 is initialized. As will be described below, they will subsequently become unsynchronized during searching operations. However, all that is necessary to reference back to real time is a count of the number of samples the NRT LSG has been shifted relative to the synchronization point. The slew counter 217 provides this count. The RT LSG 206 serves as a timing reference for maintaining a real time reference and is clocked continuously, at the chip rate.

Figure 3:
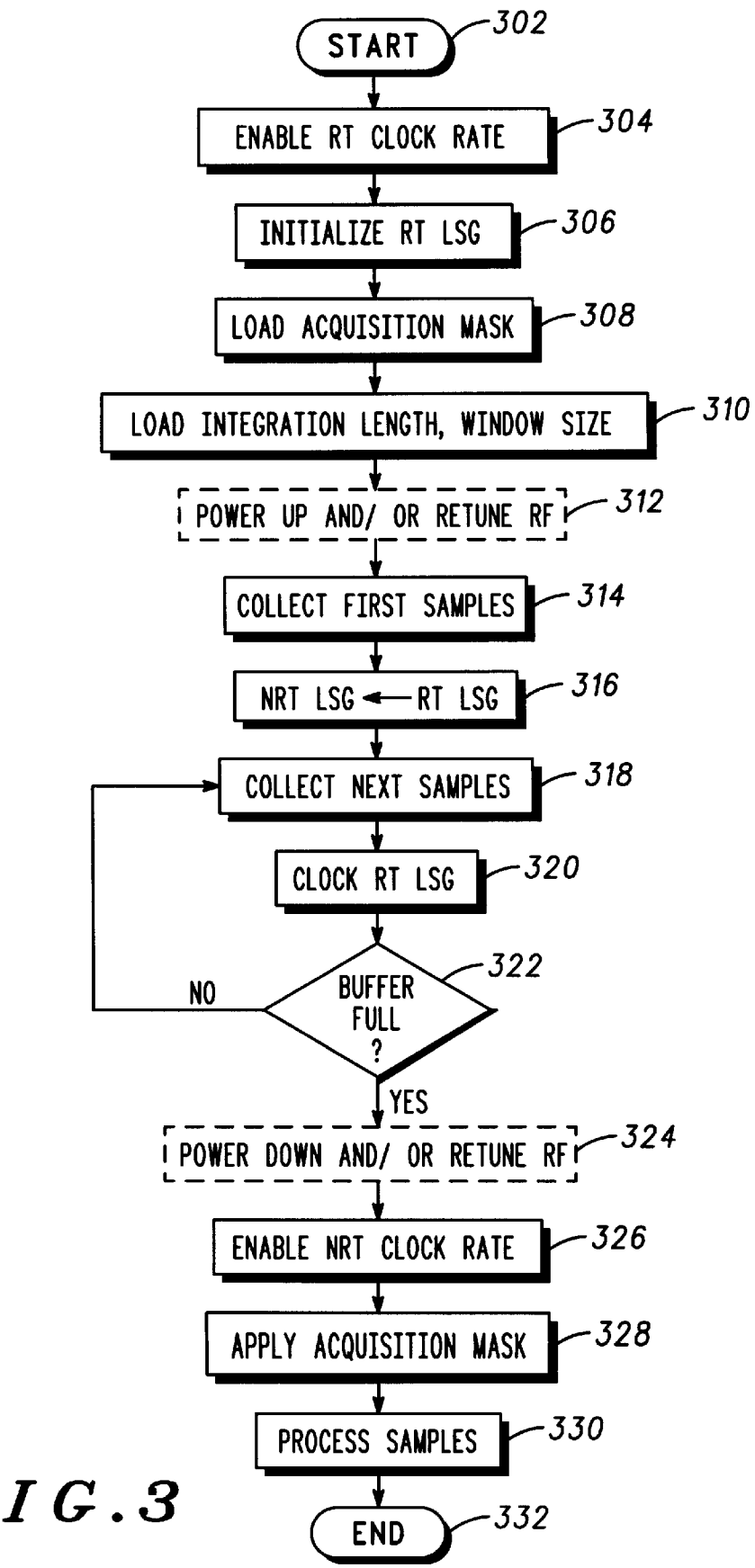
FIG. 3 is a flow diagram illustrating a method of operating the radiotelephone of FIG. 1.

FIG. 3 is a flow chart illustrating a method for operating the radiotelephone 104 of FIG. 1 for acquiring a pilot signal in a CDMA receiver. The method begins at step 302. At step 304, the real time (RT) clock is enabled. The clock controller 218 provides a clock signal at the second output 234 (FIG. 2) at a rate twice the chip rate of 1.2288 Mega-chips per second. This is the real time clock signal for the ADC 110. This clock signal is divided by the clock divider 220 to provide the real time clock signal for the RT LSG 206. At step 306 the RT LSG 206 is loaded with an initial value, initializing the timing reference.

At step 308, an acquisition mask is loaded from the mask register 212. The acquisition mask is a mask suitable for initial acquisition of a pilot signal and is, for example, a zero shift mask which does not shift the contents of the NRT LSG 208. At step 310, an integration length and a window size are loaded. The window size, W, is the number of delays, in chip intervals, to process. In IS-95, the window size value is received by the radiotelephone 104 from the base station 102. A typical value for the window size is 60 chip intervals.

The integration length is the number of samples summed by the summer 252. The integration length in the illustrated embodiment is equal to N, half the number of samples in the sample buffer 202, but may be any suitable value. In some instances, it is preferable to integrate over fewer than N samples. For example, if the analog front end 108 is not adequately tuned to the transmission frequency of the base station 102, there is a decorrelating effect by integrating or correlating over a large number of samples. In such an instance, the decorrelating effects are reduced by integrating over a smaller number of samples, such as N/2, N/4, etc. A first integration is performed, integrating over, for example the first N/2 samples, then followed by a second integration over the second N/2 samples. These correlations can be performed without having to power up the RF components or having to again collect samples, since all samples are initially collected in the sample buffer 202.

In FIG. 3, step 312 and step 324 are illustrated in dashed lines to particularly indicate that they are optional steps. In step 312, the radiotelephone 104 powers up a predetermined portion of the CDMA receiver. In the illustrated embodiment, power is provided to the radio frequency (RF) components of the radiotelephone 104 (FIG. 1). RF components include the analog front end 108 and the ADC 110. In step 324, after sample collection steps (step 314–step 322), the RF components are powered down. This feature allows the RF components, which consume relatively large amounts of power from the battery which powers the radiotelephone 104, to be energized only when they are needed, during sample collection, thus conserving battery charge. Steps 312 and 324 are optional in that they may not be used during all sequences through the flow diagram of FIG. 3. Additionally, while in a call, the radiotelephone can briefly tune to another frequency, collect a buffer of samples, retune to the original frequency and search for pilot energy on the collected samples.

At step 314, a first sample is collected in the sample buffer 202. Clock signals are provided at twice the chip rate to the ADC 110 and two samples (corresponding to one chip) are sequentially loaded into the sample buffer 202. At the time when the first sample is stored in the sample buffer 202, at step 316, the contents of the RT LSG 206 are loaded into the NRT LSG 208. In step 318, additional samples are collected in the sample buffer 202 by storing a pilot signal sample in the sample buffer 202 and the RT LSG 206 is clocked at step 320. At step 322, the sample buffer 202 is checked for a full condition. Control remains in the loop formed by step 318, step 320 and step 322 until the condition is met. Alternatively, another condition is checked, such as collecting a predetermined number of samples or any other suitable condition. At step 324, power to RF components is optionally reduced or the RF is retuned.

At step 326, a non-real time clock is enabled. The clock controller 218 provides the non-real time clock to the NRT LSG 208. The non-real time clock rate may be any available clock rate or multiple thereof, but is preferably substantially faster than the real time clock rate used for clocking samples into the sample buffer 202. For example, in an IS-95 system where the real-time clock is related to the chip rate of 1.2288 Mega-chips per second, the non-real time clock rate might be 80 MHz. At step 328, the acquisition mask is loaded to the mask circuit 210. At step 330, the samples in the sample buffer 202 are processed, a method which is illustrated in more detail in FIG. 4. The method of FIG. 3 ends at step 332.

Figure 4:
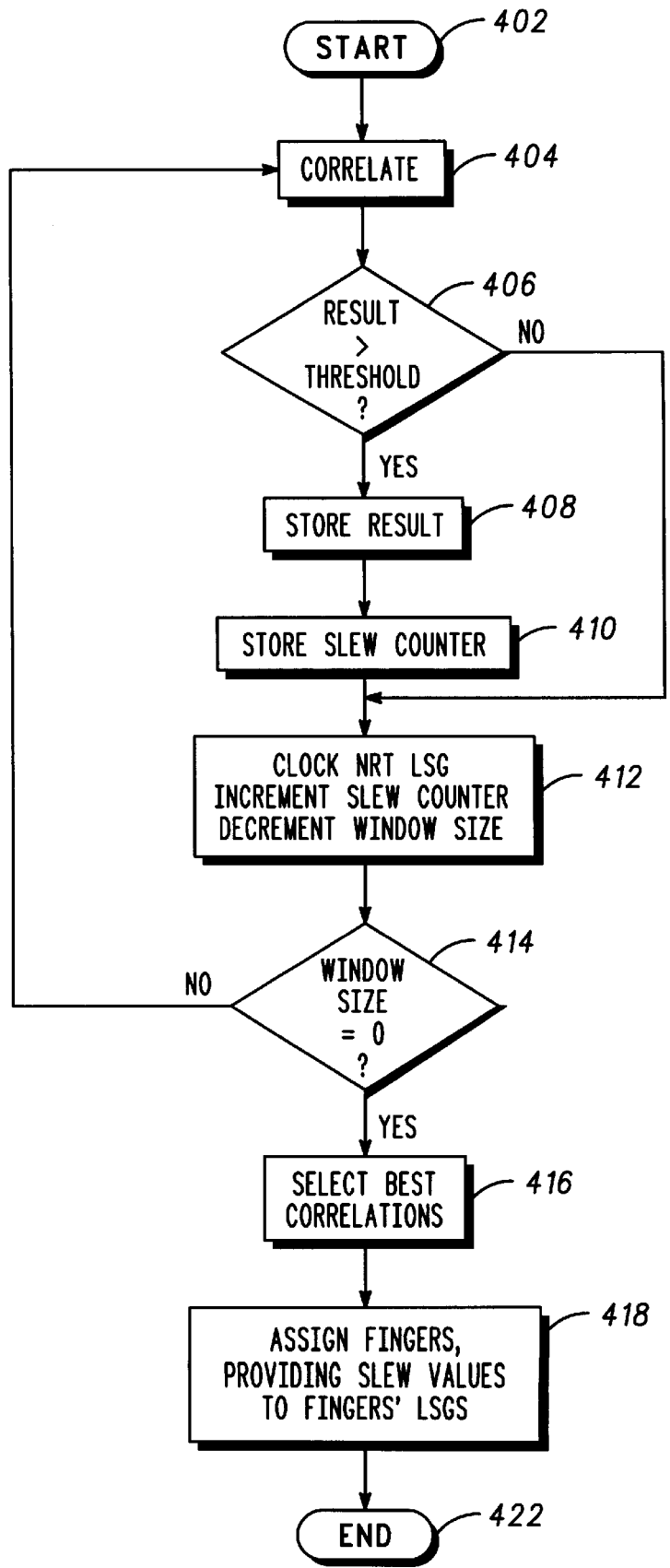
FIG. 4 is a flow diagram illustrating a method of operating the radiotelephone of FIG. 1.

Referring now to FIG. 4, a method for operating the radiotelephone 104 of FIG. 1 to process stored pilot signal samples is illustrated. The method begins at step 402.

At step 404, the correlator 204 correlates stored samples in the sample buffer 202 and contents of the non-real time linear sequence generator (NRT LSG) 208. The correlation result from the summer 252 is provided to the logic 254 which determines if the correlation result exceeds a threshold, step 406. If not, control continues at step 412. If the result does exceed the threshold, the result is stored. In addition, the slew counter value contained in the slew counter 217 is stored, step 410. The slew counter value corresponds to the number of times the NRT LSG 208 has been incremented. At step 412, the NRT LSG 208 is incremented, establishing an NRT LSG alignment value for each correlation. Also, the slew counter 217 is incremented and a window size is decremented. At 414, the window size is checked and if the exit condition is not met, the method remains in the loop which includes step 404–step 414. The loop repetitively performs the correlation of stored samples and contents of the linear sequence generator, NRT LSG 208.

In one embodiment, the invention provides an "early dump" capability. In this embodiment, the correlator 204 correlates less than a full buffer of samples, for example, N/2 samples. The result of this correlation is compared to a threshold. If the correlation exceeds the threshold, the remainder of the samples in the sample buffer are correlated and operation continues as described above. In a two phase correlator, as is shown in FIG. 2, if either of the two correlation values exceeds the threshold, processing continues as above. However, if both correlation results are less than the threshold, the correlation is aborted, the NRT LSG 208 is incremented and the slew counter 217 is incremented and processing continues. Early dump capability improves the performance of the searcher receiver by allowing PN phases which contain little or no energy to be quickly discarded without performance of a full correlation.

At step 416, the logic 254 selects the set of best correlations for assigning at least one receiver finger of the rake receiver to the detected pilot signals. The set of best correlations may have one or a plurality of correlations, depending on the correlation results and the number of rake receiver fingers to be assigned. Based on the correlation results, the logic 254 selects a number of optimum pilot signals corresponding to receiver fingers in the rake receiver 112 to be assigned. If a single ray has been located, either a directly-received ray from a base station or a multipath ray, a single receiver finger of the rake receiver 112 (FIG. 1) will be assigned, step 418. If multiple rays have been located from different base stations (with different pilot signal phases), the multiple rays will be assigned to multiple fingers of the rake receiver 112. Similarly, if all fingers of the rake receiver 112 have been previously assigned, as part of the maintenance process, the logic 254 will determine if a finger should be reassigned to a different ray based on the correlation results. Thus, step 418 includes assigning receiver fingers based on the correlation results.

The process of assigning fingers includes the slewing of the finger LSGs to bring them into alignment with the pilots and multipath components of interest. The slew counter value stored in step 410 for a pilot or path which exceeded threshold in step 405 provides the time difference in ½ chips between the mobile's timing and that of the pilot or path of interest. At step 420, the slew counter value stored by the logic 254 is provided to the linear sequence generator 128 of the receiver finger which is being assigned to the detected pilot signals. Thus, the searcher receiver 114 provides an NRT LSG alignment value which corresponds to one of the set of best correlations to the finger linear sequence generator associated with the at least one receiver finger. The at least one receiver finger uses the slew counter value to align its finger LSG to the timing of the detected pilot signal and begins detecting the pilot signal. The method for processing samples ends at step 422.

Figure 5:
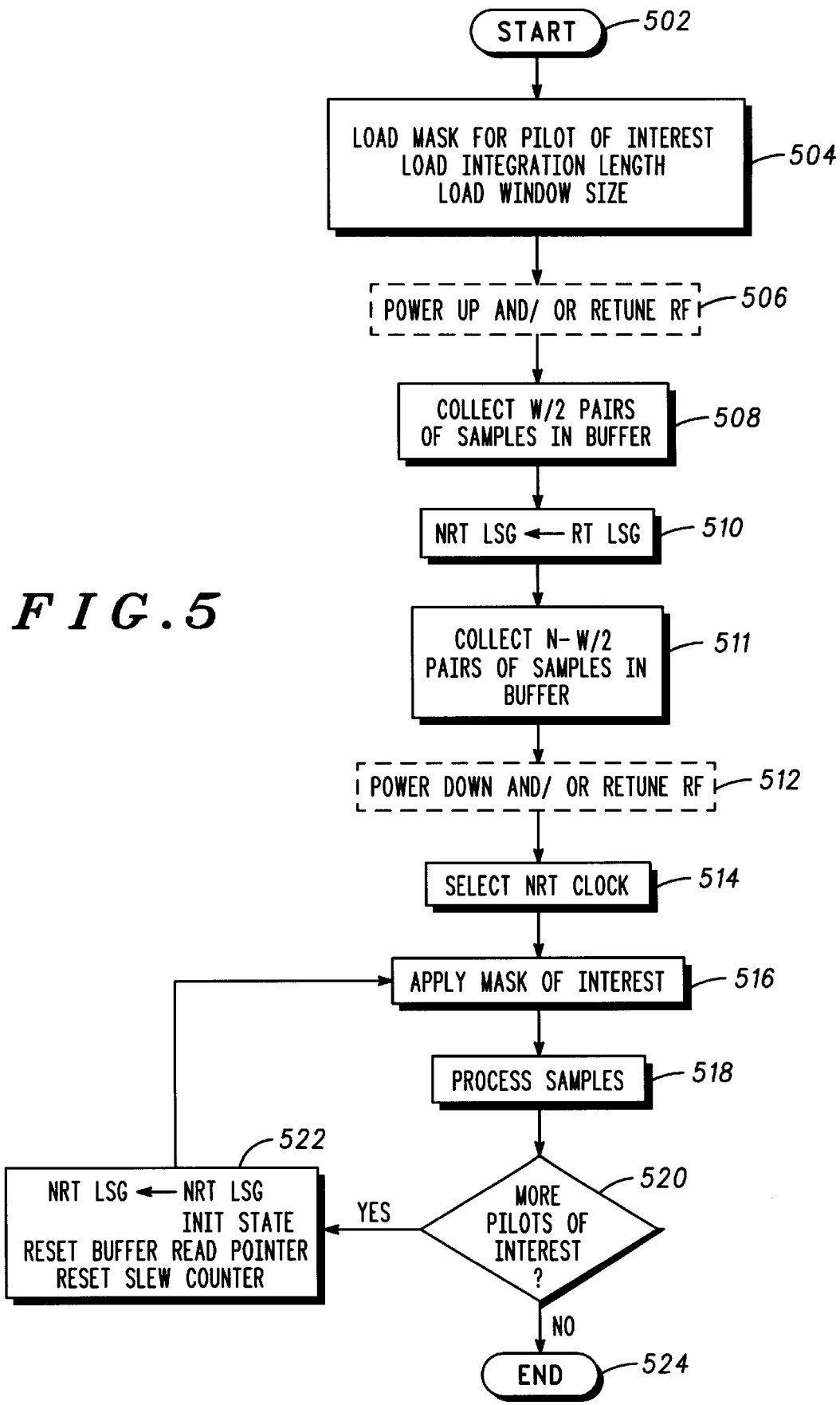
FIG. 5 is a flow diagram illustrating a method of operating the radiotelephone of FIG. 1.

Referring now to FIG. 5, a method for operating the radiotelephone 104 of FIG. 1 for maintaining finger assignments is illustrated. The method begins at step 502. At step 504, the mask for a pilot of interest is loaded from the mask register 212 to the mask circuit 210. Also, integration length and window size are loaded. At step 506, RF components are powered up if necessary. If a search or another frequency is required, the radio can be tuned to the new frequency.

At step 508, a number of sample pairs equal to one-half the window size (W/2) are collected in the sample buffer 202. Sampling is done using the real time clock. Sample pairs are collected because, as noted above, the pilot signal is sampled at twice the chip rate. Each sample pair corresponds to one chip. Other numbers of chips or samples are collected in the sample buffer 202 depending on the particular implementation.

At step 510, the contents of the RT LSG 206 are loaded into the NRT LSG 208. By storing W/2 pairs of samples prior to loading the state of the RT LSG, the NRT LSG is effectively advanced by half the window size in chips with respect to the first sample. Now, if W correlations are performed sequentially, beginning with the initial state and incrementing one chip per correlation, the search will span −W/2 to +W/2. Once the NRT LSG has been loaded in step 510, the remaining N-(W/2) samples must be collected, step 511. After the samples are collected, RF components are optionally powered down in step 512 or retuned to the original frequency.

At step 514, the NRT clock rate is selected and applied to the NRT LSG 208 for processing the samples. The mask of interest is applied to the contents of the NRT LSG 208 at step 516 and at step 518, the samples are processed. During step 518, steps corresponding to step 402–step 422 in FIG. 4 are performed. After the buffer full of samples is processed, at step 520 it is determined if there are more pilot signals of interest. For example, after waking from a slotted mode sleep time, the searcher receiver 114 has a list of active pilots, a list of candidate pilots and a list of neighbor pilots to scan for pilot signal energy to locate suitable pilot signals for finger assignment. If there are more pilots of interest, at step 522, the initial state of the NRT LSG 208 which was stored in the register 214 is loaded into the NRT LSG 208, resetting the NRT LSG 208 to an initial condition and a new mask is loaded in the mask circuit 210, shifting the NRT LSG to a next state. The next state of the NRT LSG corresponds to to a next pilot of interest. Other suitable ways of shifting the NRT LSG state include calculating the next state of the NRT LSG and incrementing or decrementing the NRT LSG to produce the next state of the NRT LSG. Also, at step 522, the read/write pointer 222 of sample buffer 202 is reset to 0, and the slew counter 217 is reset. This corresponds to resetting the NRT LSG to an initial condition using the timing reference value. The mask for the next pilot of interest is loaded at step 516. Step 516–step 522 are repeated until all pilots of interest have been processed. The method ends at step 524.

As can be seen from the foregoing, the present invention provides a method and apparatus for rapidly acquiring pilot signals in a CDMA receiver. Since multiple samples are collected in a buffer, signal processing can be uncoupled from the chip rate and pilot signal acquisition decisions can be made on a much faster basis, using a non-real time clock. Since the operation of the receiver searcher is faster, delays in pilot channel acquisition are substantially eliminated, also eliminating problems such as rapid PN. In slotted mode operation, the radiotelephone need only awaken long enough before its assigned slot for the rapid pilot acquisition to occur. Pilot channel maintenance is also more rapid, improving the reliability of idle handoff and soft handoff.

Since samples are buffered, after collection of samples, the analog front end is free to tune to another frequency during Mobile Assisted Hard Hand Off (MAHHO).

While a particular embodiment of the present invention has been shown and described, modifications may be made. For example, method steps may be rearranged, substituted and deleted as appropriate. It is therefore intended in the appended claims to cover all such changes and modifications which fall within the true spirit and scope of the invention.

What is claimed is:

1. A method for acquiring a pilot signal in a code division multiple access (CDMA) receiver, the CDMA receiver including at least one receiver finger, the method comprising the steps of:

storing a predetermined number of samples of a received signal;

incrementing a real time linear sequence generator (RT LSG);

loading a state of the RT LSG into a non-real time LSG (NRT LSG) at a particular point in time relative to storing the predetermined number of samples;

repetitively correlating stored samples and contents of the NRT LSG, producing correlations;

incrementing the NRT LSG after correlating to establish an NRT LSG alignment value;

selecting a set of best correlations;

providing an NRT LSG alignment value which corresponds to one of the set of best correlations to a finger linear sequence generator associated with the at least one receiver finger; and detecting the received signal at the at least one receiver finger using the finger linear sequence generator.

2. A method as recited in claim 1 wherein the step of incrementing the NRT LSG after correlating includes the step of incrementing a slew counter, the slew counter storing a slew counter value corresponding to a number of times the NRT LSG has been incremented.

3. A method as recited in claim 2 wherein the step of loading comprises loading a window size, the window size corresponding to a number of delays to process, and initializing the slew counter.

4. A method as recited in claim 2 wherein the step of providing the NRT LSG alignment value comprises providing the slew counter value.

5. A method as recited in claim 1 wherein the step of storing comprises:

powering up a predetermined portion of the CDMA receiver;

detecting the predetermined number of samples of the received signal; and powering down the predetermined portion of the CDMA receiver.

6. A method as recited in claim 5 wherein the method further comprises the step of tuning the CDMA receiver to a new frequency before detecting samples.

7. A method as recited in claim 5 wherein the predetermined portion comprises an analog front end of the CDMA receiver.

8. A method as recited in claim 1 wherein the method further comprises the steps of, prior to storing the predetermined number of samples, selecting a real time clock rate, sampling the received signal at a multiple of the real time clock rate, then selecting a non-real time clock rate, the non-real time clock rate being greater than the multiple of the real time clock rate.

9. A method as recited in claim 8 wherein the received signal is sampled at twice the real time clock rate.

10. A method as recited in claim 1 wherein the method further comprises the steps of establishing a real time clock rate for storing samples of the received signal and establishing a non-real time clock rate for subsequent processing, the non-real time clock rate being greater than the real time clock rate.

11. A radiotelephone operable in a communication system, the radiotelephone comprising:

a rake receiver including a plurality of receiver fingers;
a searcher receiver including:
a buffer for storing a plurality of samples of a received pilot signal;
a non-real time linear sequence generator (NRT LSG) for generating a sequence of values, the NRT LSG incrementing in response to a clock signal;
a correlator for correlating the plurality of samples and the sequence of values and producing a correlation result; and
a timing reference for maintaining a real time reference, the timing reference providing the real time reference to the NRT LSG when a first sample is stored in the buffer,
the searcher receiver detecting the received pilot signal to acquire system timing for the radiotelephone.

12. A radiotelephone as recited in claim 11 wherein the timing reference comprises a real time linear sequence generator (RT LSG) which generates a sequence of values in response to a real time clock signal, the NRT LSG incrementing in response to a non-real time clock signal.

13. A radiotelephone as recited in claim 12 wherein the RT LSG receives the real time clock signal when a sample is stored in the buffer to maintain the real time reference.

14. A radiotelephone as recited in claim 13 further comprising a register for storing an initial state of the NRT LSG, the real time reference being stored in the register when the first sample is stored, the real time reference being transferred from the register to the NRT LSG for resetting the NRT LSG to the real time reference.

15. A method for updating rake receiver finger assignments in a code division multiple access (CDMA) receiver, the method comprising the steps of:

(a) initializing a timing reference, storing a timing reference value;
(b) collecting a predetermined number of pilot signal samples;
(c) incrementing a non-real-time linear sequence generator (NRT LSG) to produce a sequence of values;
(d) correlating the predetermined number of pilot signal samples and the sequence of values, producing correlation results;
(e) repeating steps (c) and (d) a predetermined number of times;
(f) assigning receiver fingers based on the correlation results;
(g) shifting the NRT LSG to a next state; and
(h) repeating steps (b)–(g) until all pilot signals of interest have been processed.

16. A method as recited in claim 15 wherein step (a) comprises the steps of:

(a1) providing a real time linear sequence generator (RT LSG); and
(a2) initializing the RT LSG with an initial value.

17. A method as recited in claim 16 wherein step (g) comprises transferring contents of the RT LSG to the NRT LSG.

18. A method as recited in claim 17 wherein step (b) comprises the steps of:

(b1) storing a pilot signal sample in a buffer;

(b2) incrementing the RT LSG; and (b3) repeating steps (b1)–(b2) until the predetermined number of pilot signal samples is stored in the buffer.

19. A method as recited in claim 15 wherein step (g) comprises loading an initial state in the NRT LSG using the timing reference and masking contents of the NRT LSG to produce a next state of the NRT LSG.

20. A method as recited in claim 15 wherein step (g) comprises calculating a next state of the NRT LSG and loading the next state into the NRT LSG.

21. A method as recited in claim 15 wherein step (g) comprises incrementing the NRT LSG to produce a next state of the NRT LSG.

22. A method as recited in claim 15 wherein step (d) comprises the steps of:

(d1) producing a correlation result; and (d2) when the correlation result exceeds a threshold value, storing the correlation result and storing a slew counter value corresponding to a number of times the NRT LSG has been incremented.

23. A method as recited in claim 22 wherein step (f) comprises the steps of:

(f1) based on the correlation results, selecting a number of optimum pilot signals corresponding to a number of receiver fingers in the CDMA receiver; and (f2) providing the slew counter value to a respective receiver finger for alignment of a linear sequence generator of the respective receiver finger for receipt of a respective optimum pilot signal.

24. A method as recited in claim 15 further comprising the steps of:

before collecting the predetermined number of pilot signal samples, powering up a portion of the CDMA receiver; and after collecting the predetermined number of pilot signal samples, powering down the portion of the CDMA receiver.

25. A method as recited in claim 24 further comprising the step of retuning the CDMA receiver to another frequency.

26. A method as recited in claim 24 wherein the portion of the CDMA receiver comprises an analog front end of the CDMA receiver.

27. A method as recited in claim 15 wherein step (b) comprises the steps of:

selecting a real time clock rate for collecting pilot signal samples; and selecting a non-real time clock rate for subsequent processing of the pilot signal samples, the non-real time clock rate being greater than the real time clock rate.

* * * * *